United States Patent
Niergarth et al.

(10) Patent No.: US 12,123,350 B2
(45) Date of Patent: Oct. 22, 2024

(54) THREE-STREAM ENGINE HAVING A HEAT EXCHANGER

(71) Applicant: General Electric Company, Schenectady, NY (US)

(72) Inventors: Daniel Alan Niergarth, Norwood, OH (US); Nicholas M. Daggett, Cincinnati, OH (US); Steven Douglas Johnson, Milford, OH (US); Anand P. Roday, Mason, OH (US); Scott Alan Schimmels, Miamisburg, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/190,076

(22) Filed: Mar. 2, 2021

(65) Prior Publication Data
US 2022/0282670 A1 Sep. 8, 2022

(51) Int. Cl.
| | |
|---|---|
| *F02C 7/18* | (2006.01) |
| *F02C 7/14* | (2006.01) |
| *F02C 7/047* | (2006.01) |
| *F02K 3/077* | (2006.01) |

(52) U.S. Cl.
CPC .............. *F02C 7/18* (2013.01); *F02C 7/14* (2013.01); *F02C 7/047* (2013.01); *F02K 3/077* (2013.01); *F05D 2240/12* (2013.01); *F05D 2260/213* (2013.01)

(58) Field of Classification Search
None
See application file for complete search history.

(56) References Cited

U.S. PATENT DOCUMENTS

| | | | |
|---|---|---|---|
| 3,981,466 | A | 9/1976 | Shah |
| 5,386,689 | A | 2/1995 | Bozich et al. |
| 7,607,308 | B2 | 10/2009 | Kraft et al. |
| 8,702,378 | B2 | 4/2014 | Foster |
| 8,844,264 | B2 | 9/2014 | Khalid |
| 9,677,501 | B2 | 6/2017 | Pierluissi et al. |
| 9,845,768 | B2 | 12/2017 | Pesyna et al. |
| 10,036,329 | B2 | 7/2018 | Suciu |
| 10,227,950 | B1 | 3/2019 | Dyson, Jr. |
| 10,364,750 | B2 | 7/2019 | Rambo |

(Continued)

FOREIGN PATENT DOCUMENTS

| | | |
|---|---|---|
| CN | 206131513 U | 4/2017 |
| EP | 3130539 A1 | 2/2017 |
| EP | 3735518 A1 | 11/2020 |

*Primary Examiner* — Gerald L Sung
*Assistant Examiner* — Alyson Joan Harrington
(74) *Attorney, Agent, or Firm* — Dority & Manning, P.A.

(57) ABSTRACT

A three-stream engine is provided. The three-stream engine includes a fan section, a core engine disposed downstream of the fan section, and a core cowl annularly encasing the core engine and at least partially defining a core duct. A fan cowl is disposed radially outward from the core cowl and annularly encasing at least a portion of the core cowl. The fan cowl at least partially defining an inlet duct and a fan duct. The fan duct and the core duct at least partially co-extending axially on opposite sides of the core cowl. A heat exchanger disposed within the fan duct. The heat exchanger provides for thermal communication between a fluid flowing through fan duct and a motive fluid flowing through the heat exchanger.

15 Claims, 8 Drawing Sheets

(56) References Cited

U.S. PATENT DOCUMENTS

| | | |
|---|---|---|
| 10,507,934 B1 | 12/2019 | Dyson, Jr. |
| 10,544,737 B2 | 1/2020 | Bowden et al. |
| 10,677,166 B2 | 6/2020 | Pesyna et al. |
| 2016/0017810 A1 | 1/2016 | Lord et al. |
| 2016/0201989 A1* | 7/2016 | Martinez ............... F02C 7/18 |
| | | 29/890.03 |
| 2017/0002230 A1* | 1/2017 | Nowak ............ C08G 18/8083 |
| 2017/0298763 A1* | 10/2017 | Olver ................. F01D 25/12 |
| 2018/0328285 A1 | 11/2018 | Tajiri et al. |
| 2019/0271267 A1* | 9/2019 | Husband ............... F02C 7/185 |
| 2020/0122843 A1 | 4/2020 | Porte et al. |
| 2020/0332717 A1* | 10/2020 | Rambo ................. F02K 3/077 |
| 2020/0362759 A1* | 11/2020 | Roberge ................ F02C 7/18 |

\* cited by examiner

THREE-STREAM ENGINE HAVING A HEAT EXCHANGER

FIELD

The present subject matter relates generally to open rotor and ducted propulsion systems. In particular, the present subject matter relates to utilizing heat exchangers within an air flowpath of a propulsion system.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

In at least certain embodiments, the gas turbine may employ an open rotor propulsion system that operates on the principle of having a fan located outside of the engine nacelle, in other words, "unducted". This permits the use of larger fan blades able to act upon a larger volume of air than for a turbofan engine, and thereby improves propulsive efficiency over conventional ducted engine designs.

During operation of the gas turbine engine, such as a gas turbine employing an open rotor propulsion system, various systems may generate a relatively large amount of heat. For example, a substantial amount of heat may be generated during operation of the thrust generating systems, electric motors and/or generators, hydraulic systems or other systems. Accordingly, a means for dissipating the heat generated by the various systems without negatively impacting the efficiency of the gas turbine engine would be advantageous in the art.

BRIEF DESCRIPTION

Aspects and advantages of the invention will be set forth in part in the following description, or may be obvious from the description, or may be learned through practice of the invention.

In one exemplary aspect of the present disclosure, a three-stream engine is provided. The three-stream engine includes a fan section, a core engine disposed downstream of the fan section, and a core cowl annularly encasing the core engine and at least partially defining a core duct. A fan cowl is disposed radially outward from the core cowl and annularly encasing at least a portion of the core cowl. The fan cowl at least partially defining an inlet duct and a fan duct. The fan duct and the core duct at least partially co-extending axially on opposite sides of the core cowl. A heat exchanger disposed within the fan duct. The heat exchanger provides for thermal communication between a fluid flowing through fan duct and a motive fluid flowing through the heat exchanger.

In another exemplary aspect of the present disclosure, a method of operating a three-stream engine is provided. The method includes a step of operating a fan section to produce a stream of air within an inlet duct. The inlet duct at least partially defined by a fan cowl. The method further includes a step of directing a first portion of the stream of air into a core duct defined at least partially by a core cowl. The core cowl annularly encasing a core engine. The method further includes directing a second portion of the stream of air into a fan duct defined by the core cowl and the fan cowl. The method further includes passing an amount of the second portion of the stream into a heat exchanger poisoned within the fan duct to cool a motive fluid traveling through the heat exchanger.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
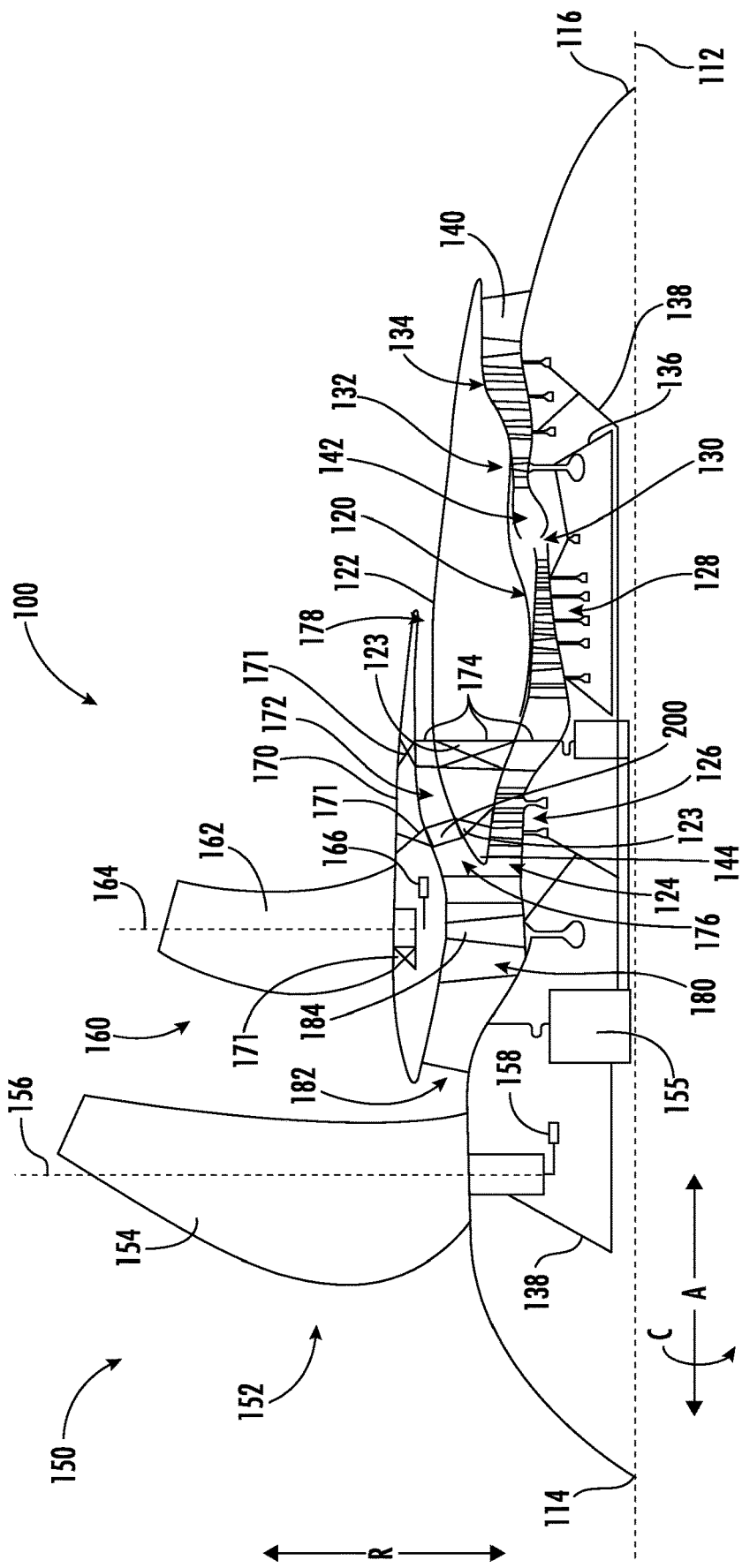
FIG. 1 is a schematic cross-sectional view of a three-stream engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The term "fluid" may be a gas or a liquid. The term "fluid communication" means that a fluid is capable of making the connection between the areas specified.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, a three-stream engine can be equipped with one or more heat exchangers. The heat exchangers can be provided to cool certain systems of the gas turbine engine or of the aircraft that the gas turbine engine is installed upon. For example, the heat exchanger(s) may be provided to cool a turbine section or an auxiliary system, such as a lubrication system, supercritical C02 system, fueling system. The heat transfer system can cool (or heat) these systems by cooling (or heating) a fluid, such as air or a lubricant, that is delivered to these systems.

Systems are described herein that extend beyond the three-stream engine. It will be appreciated that these systems are provided by way of example only, and the claimed systems are not limited to applications using or otherwise incorporated with these other systems. The disclosure is not intended to be limiting. For example, it should be understood that one or more embodiments described herein may be configured to operate independently or in combination with other embodiments described herein.

FIG. 1 provides a schematic cross-sectional view of a gas turbine engine according to one example embodiment of the present disclosure. Particularly, FIG. 1 provides an aviation three-stream turbofan engine herein referred to as "three-stream engine 100". The three-stream engine 100 of FIG. 1 can be mounted to an aerial vehicle, such as a fixed-wing aircraft, and can produce thrust for propulsion of the aerial vehicle. The three-stream engine 100 is a "three-stream engine" in that its architecture provides three distinct streams of thrust-producing airflow during operation.

Additionally, A "third stream" as used herein means a secondary air stream capable of increasing fluid energy to produce a minority of total propulsion system thrust. A pressure ratio of the third stream is higher than that of the primary propulsion stream (e.g., a bypass or propeller driven propulsion stream). The thrust may be produced through a dedicated nozzle or through mixing of the secondary air stream with the primary propulsion stream or a core air stream, e.g., into a common nozzle. In certain exemplary embodiments an operating temperature of the secondary air stream is less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the secondary air stream and a separate fluid stream. Further, in certain exemplary embodiments, the secondary air stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions. Furthermore in certain exemplary embodiments, aspects of the secondary air stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions. In the embodiments discussed hereinbelow, the fan duct 172 of the three-stream engine 100 may be a "third stream" in accordance with the above definition.

For reference, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 120 and a fan section 150 positioned upstream thereof. Generally, the core engine 120 includes, in serial flow order, a compressor section, a combustion section, a turbine section, and an exhaust section. Particularly, as shown in FIG. 1, the core engine 120 includes a core cowl 122 that defines an annular core inlet 124. The core cowl 122 further encloses a low pressure system and a high pressure system. The core cowl 122 may at least partially house a supporting frame 123, which may provide structural support for the core cowl 122 as well as various other components of the three-stream engine 100, such as the one or more heat exchangers 200. For example, the supporting frame 123 may be at least partially housed within the core cowl 122 and may couple to an interior of the core cowl 122, in order to provide structural support for the core cowl 122. In addition, one or more components of the three-stream engine 100 may extend through the core cowl 122 and couple directly to the supporting frame 123, such as the stationary strut 174 and/or the heat exchanger 200. In many embodiments, the core cowl 122 may enclose and support a booster or low pressure ("LP") compressor 126 for pressurizing the air that enters the core engine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air. It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 128 drives the high pressure compressor 128 through a high pressure shaft 136. In this regard, the high pressure turbine 128 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the core engine 120 through a core exhaust nozzle 140 to produce propulsive thrust. Accordingly, the core engine 120 defines a core flowpath or core duct 142 that extends between the core inlet 124 and the core exhaust nozzle 140. The core duct 142 is an annular duct positioned generally inward of the core cowl 122 along the radial direction R.

The fan section 150 includes a fan 152, which is the primary fan in this example embodiment. For the depicted embodiment of FIG. 1, the fan 152 is an open rotor or unducted fan 152. However, in other embodiments, the fan 152 may be ducted, e.g., by a fan casing or nacelle circumferentially surrounding the fan 152. As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. Optionally, as shown in FIG. 1, the fan 152 can be coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this embodiment, each blade 154 of the fan 152 is rotatable about their respective central blades axes 156, e.g., in unison with one another. One or more actuators 158 can be controlled to pitch the blades 154 about their respective central blades axes 156. However, in other embodiments, each blade 154 may be fixed or unable to be pitched about its central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or may be shrouded, e.g., by an annular shroud spaced outward from the tips of the fan guide vanes 162 along the radial direction R. Each fan guide vane 162 defines a central blade axis 164. For this embodiment, each fan guide vane 162 of the fan guide vane array 160 is rotatable about their respective central blades axes 164, e.g., in unison with one another. One or more actuators 166 can be controlled to pitch the fan guide vane 162 about their respective central blades axes 164. However, in other embodiments, each fan guide vane 162 may be fixed or unable to be pitched about its central blade axis 164. The fan guide vanes 162 are mounted to a fan cowl 170, or, alternatively, the fan guide vanes 162 may be mounted to a support frame 171 that is housed within the fan cowl 170.

As shown in FIG. 1, in addition to the fan 152, which is unducted, a ducted fan 184 is included aft of the fan 152, such that the three-stream engine 100 includes both a ducted and an unducted fan which both serve to generate thrust through the movement of air at atmospheric temperature without passage through core engine 120. The ducted fan 184 is shown at about the same axial location as the fan blade 162, and radially inward of the fan blade 154, and, in some embodiments, the ducted fan may be approximately radially inward of the fan blade 162. Alternatively, the ducted fan 184 may be axially between the fan blade 154 and core cowl 122, or be farther forward of the fan blade 154. The ducted fan 184 may be driven by the low pressure turbine 134 (e.g. coupled to the LP shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define third stream or fan duct 172. Incoming fluid (e.g. air) may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. A supporting frame 171 may be at least partially housed within the fan cowl 122, which may couple to an interior of the fan cowl 170 and provide structural support for the fan cowl 170. In addition, one or more components of the three-stream engine 100 may extend through the fan cowl 170 and couple directly to the supporting frame 171, such as the fan guide vane 162, the struts 174, and/or the heat exchanger 200. The fan cowl 170 and the core cowl 122 are connected together and supported by a plurality of substantially radially-extending, circumferentially-spaced stationary struts 174 (only one shown in FIG. 1). In many embodiments, the stationary struts 174 may be coupled to, and may extend between, the supporting frame 123 housed within the core cowl 122 and the supporting frame 171 housed within the fan cowl 170. The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 122 may at least partially co-extend (generally axially) on opposite sides (e.g. opposite radial sides) of the core cowl 122. For example, the fan duct 172 and the core duct 122 may each extend directly from the leading edge 144 of the core cowl 122 and may partially co-extend generally axially on opposite radial sides of the core cowl.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the array of fan guide vanes 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

In exemplary embodiments, air passing through the fan duct 172 may be relatively cooler (e.g. lower temperature) than one or more fluids utilized in the core engine 120. In this way, one or more heat exchangers 200 may be disposed within the fan duct 172 and utilized cool one or more fluids from the core engine with the air passing through the fan duct 172, in order to increase the efficiency of the entire three-stream engine.

Figure 2:
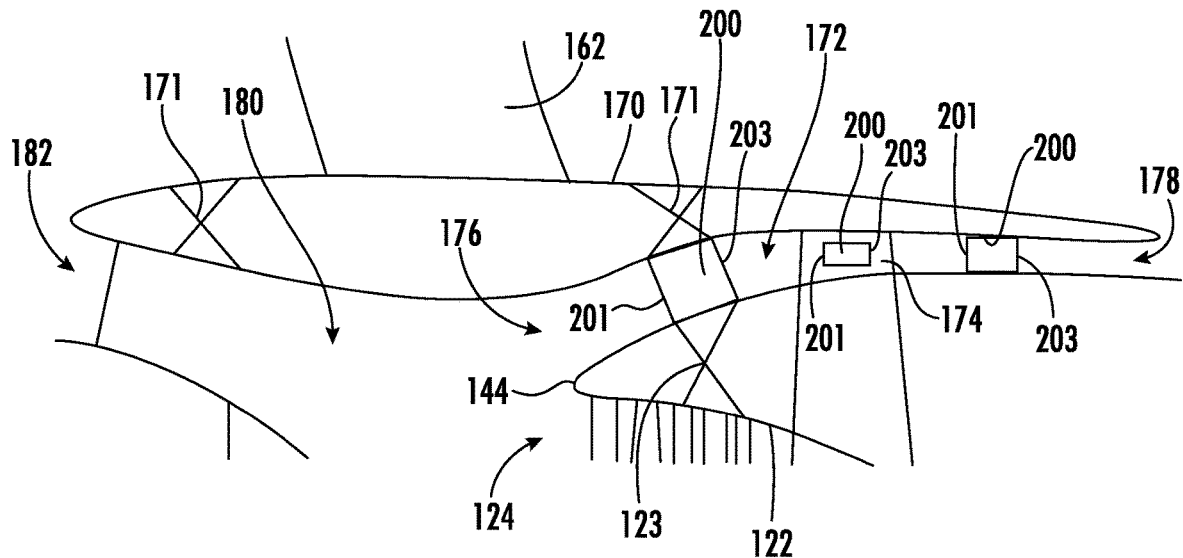
FIG. 2 is a schematic enlarged cross-sectional view of a three-stream engine in accordance with an exemplary embodiment of the present disclosure.
Figure 3:
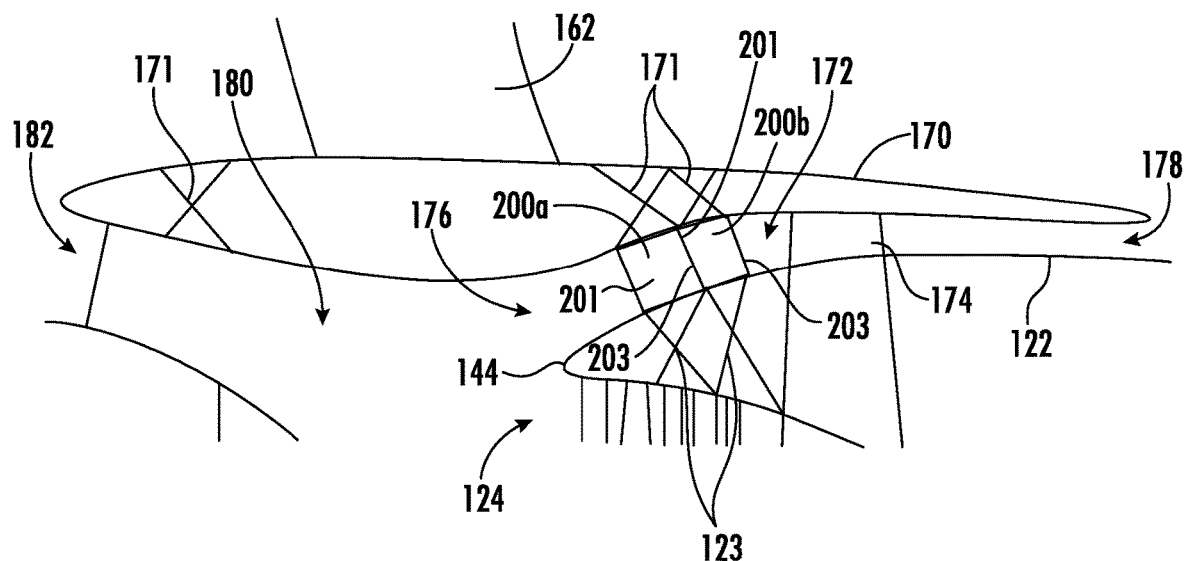
FIG. 3 is a schematic enlarged cross-sectional view of a three-stream engine in accordance with an exemplary embodiment of the present disclosure.

FIGS. 2 and 3 illustrate an enlarged cross-sectional view of a three-stream engine 100 (such as the three stream engine shown in FIG. 1), which each include one or more heat exchangers 200 disposed within the fan duct 172. As shown, particularly in FIG. 2, in some embodiments, the heat exchanger 200 may be disposed axially forward of the at least one stationary strut 174 within the fan duct 172, such that air passing through the fan duct 172 passes through the heat exchanger 200 prior to passing around the stationary strut 174. Additionally or alternatively, the heat exchanger 200 may be disposed axially aft of the at least one stationary strut 174 within the fan duct 172, such that air passing through the fan duct 172 passes around the stationary strut 174 prior to passing through the heat exchanger 200. In further additional or alternative embodiments, as shown in FIG. 2, one or more heat exchangers 200 may be disposed at the same axial location as the stationary strut 174 (or at least partially axially overlapping with the strut). In such embodiments, as discussed below, the one or more heat exchangers may be at least partially coupled to the stationary strut 174.

Each of the heat exchangers 200 may include an air inlet 201 and an air outlet 203. The air inlet 201 receives air passing through the fan duct 172, which is then routed through the heat exchanger 200 where heat is collected from a motive fluid passing through the heat exchanger 200. The air outlet 203 then expels the used air back into the fan duct 172.

In the embodiment shown in FIG. 2, the heat exchangers 200 may be axially spaced apart from one another, such that air exiting the air outlet 203 of a first heat exchanger 200 travels an axial distance within the fan duct 172 before entering the air inlet 201 of a second heat exchanger. Additionally or alternatively, as shown in FIG. 3, the one or more heat exchangers 200 may be a first heat exchanger 200*a* and a second heat exchanger 200*b* each disposed within the fan duct 172 and axially stacked with one another. In other words, the air outlet 203 of the first heat exchanger 200*a* may be directly adjacent (or coupled to) the air inlet 201 of the second heat exchanger 200*b*, such that all the air exiting the first heat exchanger 200*a* enters the second heat exchanger 200*b*. Such a configuration may be advantageous if, for example, the first heat exchanger 200*a* carries a different motive fluid than the second heat exchanger 200*b*, such that the heat transfer between the air and the respective fluids may be optimized.

Figure 4:
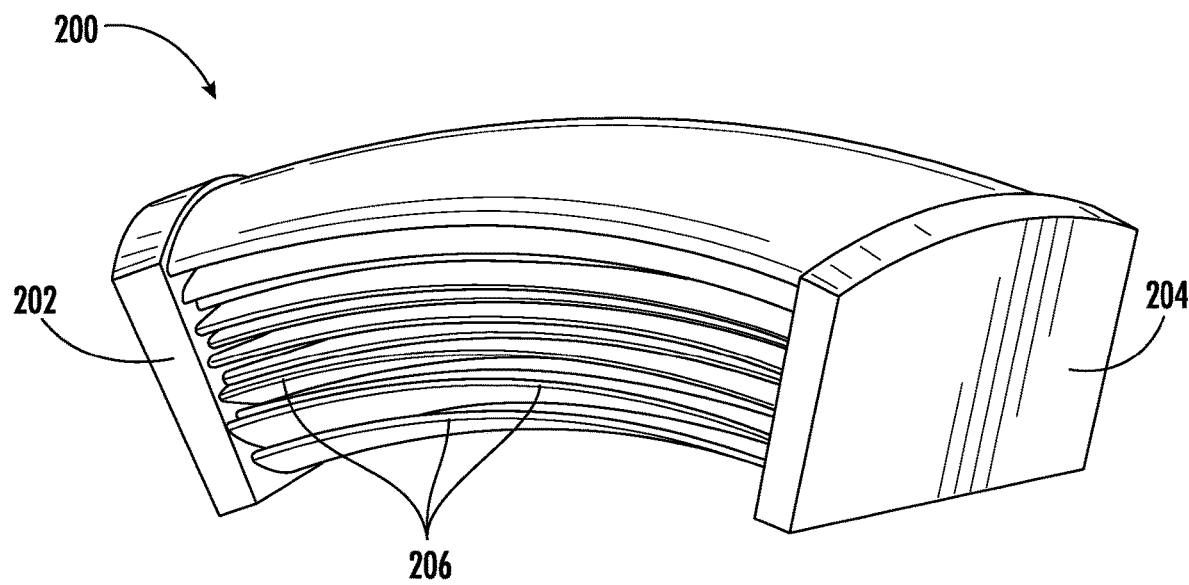
FIG. 4 is an enlarged perspective view of a heat exchanger, which may be employed within a three-stream engine, in accordance with an exemplary embodiment of the present disclosure.

FIG. 4 illustrates an enlarged perspective view of a heat exchanger 200, which may be referred to as an "onion" heat exchanger, and which may be employed in the three-stream engine 100, in accordance with embodiments of the present disclosure. As shown, the heat exchanger 200 may include a first wall manifold 202, a second manifold wall 204 spaced apart from the first wall 202, and one or more vanes 206 extending between the first manifold wall 202 and the second manifold wall 204. The heat exchanger 200 described herein may be substantially hollow, such that a plurality of individualized fluid circuits are defined within the heat exchanger. The plurality of individualized fluid circuits allow for multiple different motive fluids (e.g. from various systems of an aircraft engine) to pass through the heat exchanger 200 simultaneously and thermally communicate with one another and with the air passing through an aircraft engine. For example, both the wall manifolds 202, 204 and the vanes 206, may include various fluid passages and channels circumscribed therein, in order to permit a motive fluid to travel therethrough during operation.

The manifold walls 202, 204 may act as fluid routing manifolds, which route the motive fluid to and from the various passages defined within the vanes 206 of the heat exchanger 200. In exemplary implementations, the heat exchanger 200 may be employed within the fan duct 172 of the three-stream engine 100 (as shown in FIG. 1), where the relatively cool air flowing through the fan duct 172 passes through the vanes 206 and between the manifold walls 202, 204 of the heat exchanger 200 and provides cooling (or heating in some embodiments) to one or more motive fluid traveling therethrough.

As shown, the first wall manifold 202 may be shaped generally as a rectangular prism having a singular curved surface (e.g. the radially outward surface). Likewise, the second wall manifold 204 may be shaped generally as a rectangular prism having a singular curved surface (e.g. the radially outward surface).

As shown FIG. 4, one or more portions of the heat exchanger 200, may be generally curved (or non-straight). For example, as shown in FIG. 4, the vanes 206 may be generally contoured to correspond with the fan duct 172 and/or the circumferential direction C, in order to utilize the air flow within the heat exchanger 200 without creating a wake within the fan duct 172. In some embodiments, the first wall manifold 202 and the second wall manifold 204 may generally taper away from one another in the circumferential direction C as they extend radially. In this manner, a circumferential length of the vanes 206 may progressively get longer the further radially outward the vanes 206 are positioned on the heat exchanger 200. For example, a circumferential length of the radially inwardmost vane 206 may be shorter than a circumferential length of the radially outwardmost vane 206. This may be advantageous when operating the heat exchanger 200, e.g., if a motive fluid needed more cooling, it could be routed to a fluid circuit disposed within a radially outer vane 206, thereby providing more cooling due to the relative increased length of the vane 206.

In many embodiments, the heat exchanger 200 described herein may be integrally formed as a single component. That is, each of the subcomponents, e.g., the first wall manifold 202, the second wall manifold 204, and the plurality of vanes 206, and any other subcomponent of the heat exchanger 200, may be manufactured together as a single body. In exemplary embodiments, this may be done by utilizing an additive manufacturing system and method, such as direct metal laser sintering (DMLS), direct metal laser melting (DMLM), or other suitable additive manufacturing techniques. In other embodiments, other manufacturing techniques, such as casting or other suitable techniques, may be used. In this regard, by utilizing additive manufacturing methods, the heat exchanger 200 may be integrally formed as a single piece of continuous metal and may thus include fewer sub-components and/or joints compared to prior designs. The integral formation of the heat exchanger 200 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced. Further, the integral formation of the heat exchanger 200 may favorably reduce the weight of the heat exchanger 200 as compared to other manufacturing methods, which thereby decreases the overall weight of the aircraft engine in which it is deployed and increases efficiency.

Alternatively, the first wall manifold 202 and the second wall manifold 204 may each be separately integrally formed. In such embodiments, the first wall manifold 202 and the second wall manifold 204 may each be welded to the plurality of vanes 206. Manufacturing the wall manifolds 202, 204 separately may advantageously reduce production time of the overall heat exchanger 200, thereby cutting manufacturing costs considerably.

Figure 5:
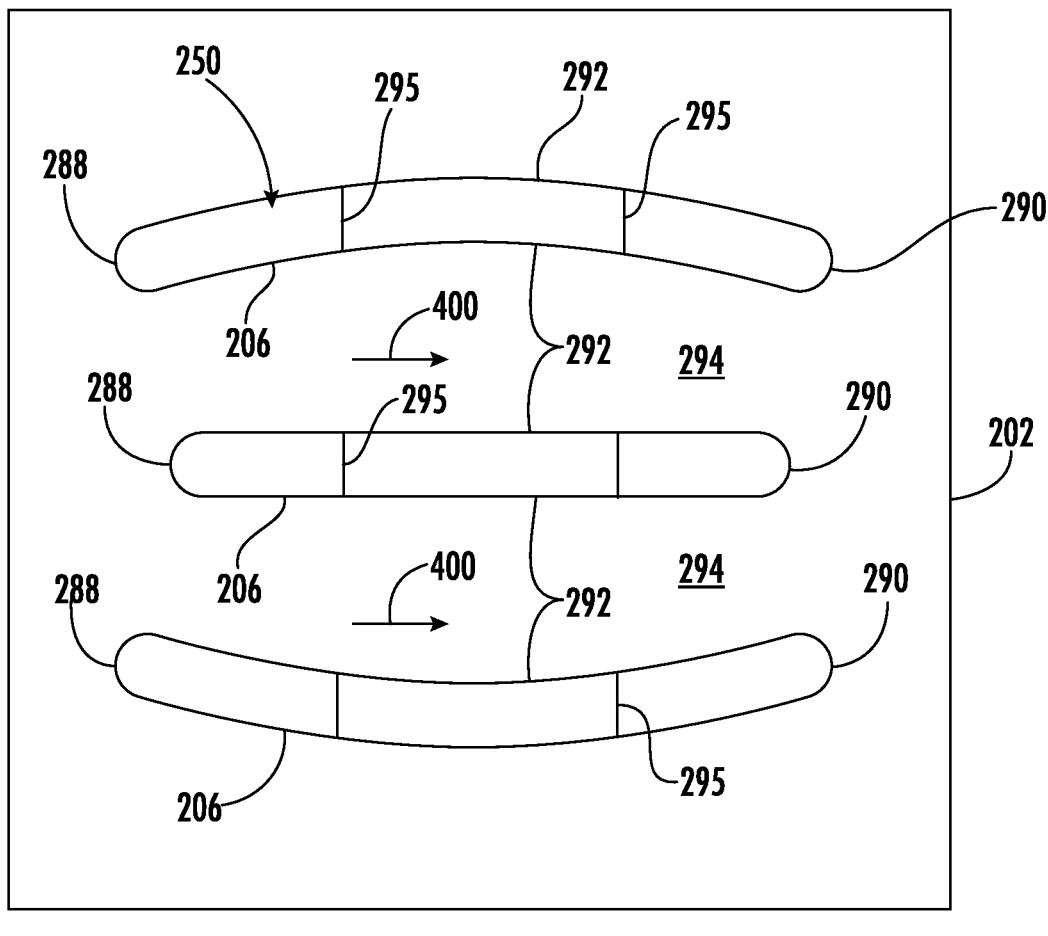
FIG. 5 is a cross sectional view of a heat exchanger from along a circumferential direction C, in accordance with an exemplary embodiment of the present disclosure

FIG. 5 illustrates a cross sectional view of a heat exchanger 200 from along the circumferential direction C. In exemplary embodiments, each vane 206 in the plurality of vanes 206 may include a leading edge 288, a trailing edge 290, and side walls 292 that extend between the leading edge 288 and the trailing edge 290. As shown in FIG. 5, the plurality of vanes 206 may be spaced apart from one another along the radial direction R to define airflow passages 294 between the vanes 206. In operation, the leading edge 288 may engage air 400 traveling through the engine (e.g. within the fan flow passage 48 or the fan duct 172). The air 400 may then flow into the airflow passage 294 defined between the vanes 206 (e.g. specifically defined radially between the side walls 292 of neighboring vanes 206). Finally, the air 400 may be expelled from the heat exchanger 200 at the trailing edge 290 of the vanes 206. For example, the airflow passages 294 defined between the vanes 206 of the heat exchanger 200 may diverge radially after the leading edge 288 and subsequently converges radially toward the trailing edge 290. In such embodiments, the airflow passages 294 have may have a larger area in the middle, which decreases the Mach number reduce pressure drop, before gradually converging to pick up velocity to maintain thrust capability. This allows a significant portion of the heat transfer to occur at surfaces in regions of lower Reynolds numbers and friction, which gives the resulting lower pressure drop.

Although the air 400 is fluidly isolated from the motive fluid traveling through each of the passages defined within the vanes 206 of the heat exchanger 200, the vanes 206 may allow for thermal communication between the air 400 and the motive fluid within the passages. As shown in FIG. 5, each airflow passage 294 may receive and expel a flow of air 400 in a direction generally perpendicular to the passages defined within the vanes 206. As shown in FIG. 5, the vanes 206 may further include one or more ribs 295, which may extend generally radially within the vanes 206.

In exemplary embodiments, the heat exchanger 200 described herein may be the "onion" style heat exchanger. However, in other embodiments, the heat exchanger 200 may be any suitable type of heat exchanger known in the art, and the present invention should not be limited to the "onion" style heat exchanger described herein unless specifically recited in the claims.

Figure 6:
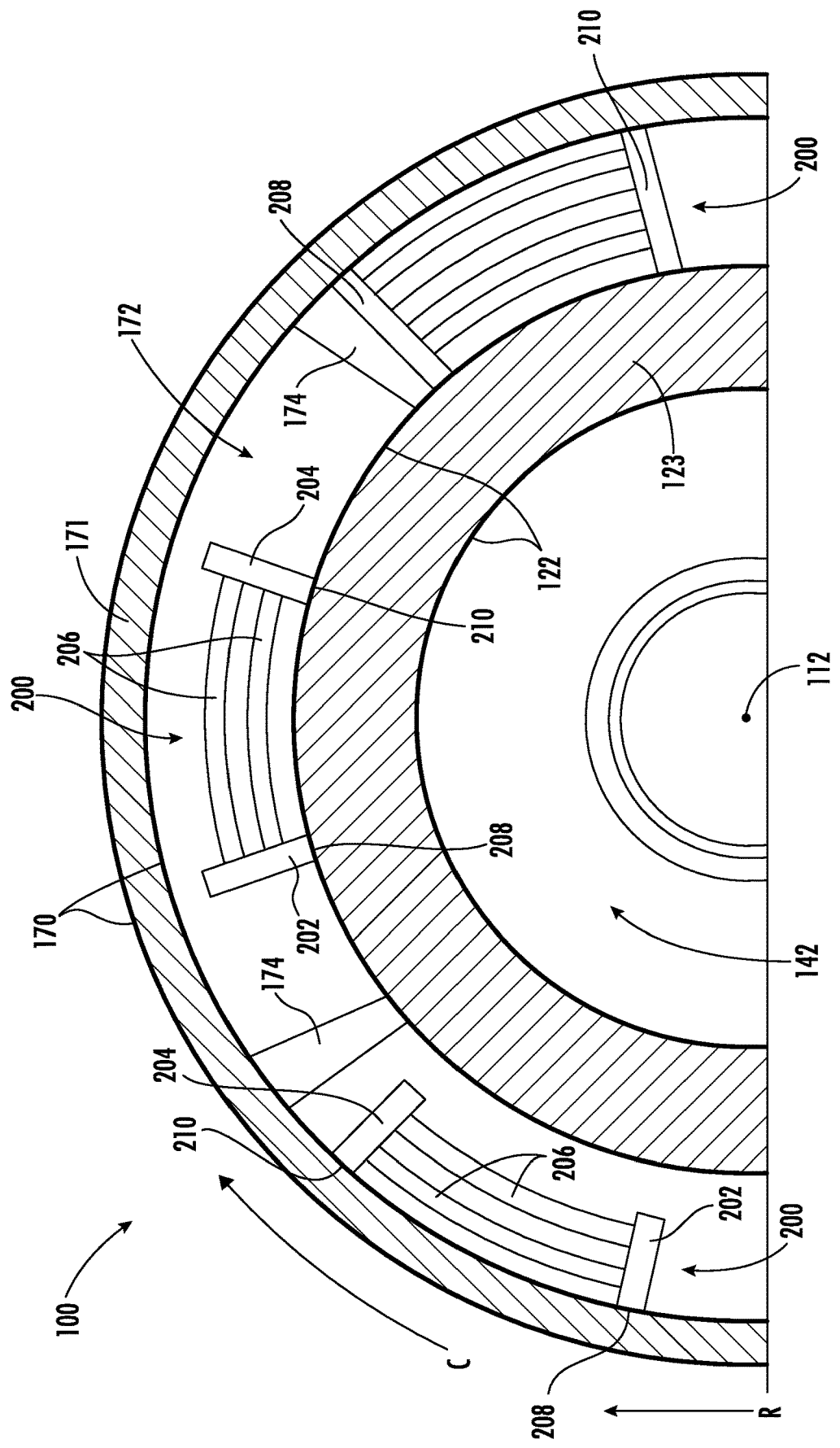
FIG. 6 is a schematic cross-sectional view of a three-stream engine in accordance with an exemplary embodiment of the present disclosure.
Figure 7:
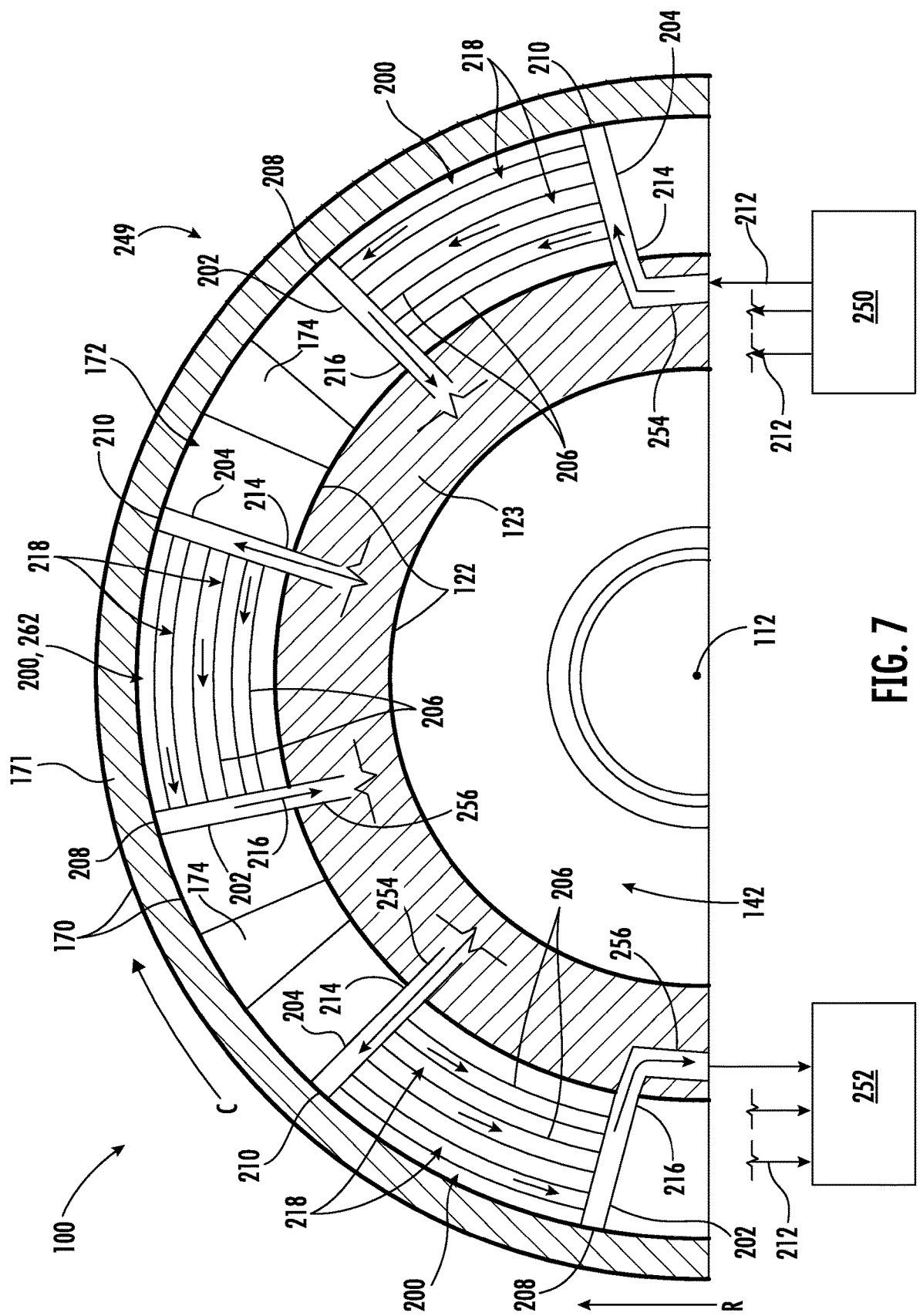
FIG. 7 a schematic cross-sectional view of a three-stream engine in accordance with an exemplary embodiment of the present disclosure.
Figure 8:
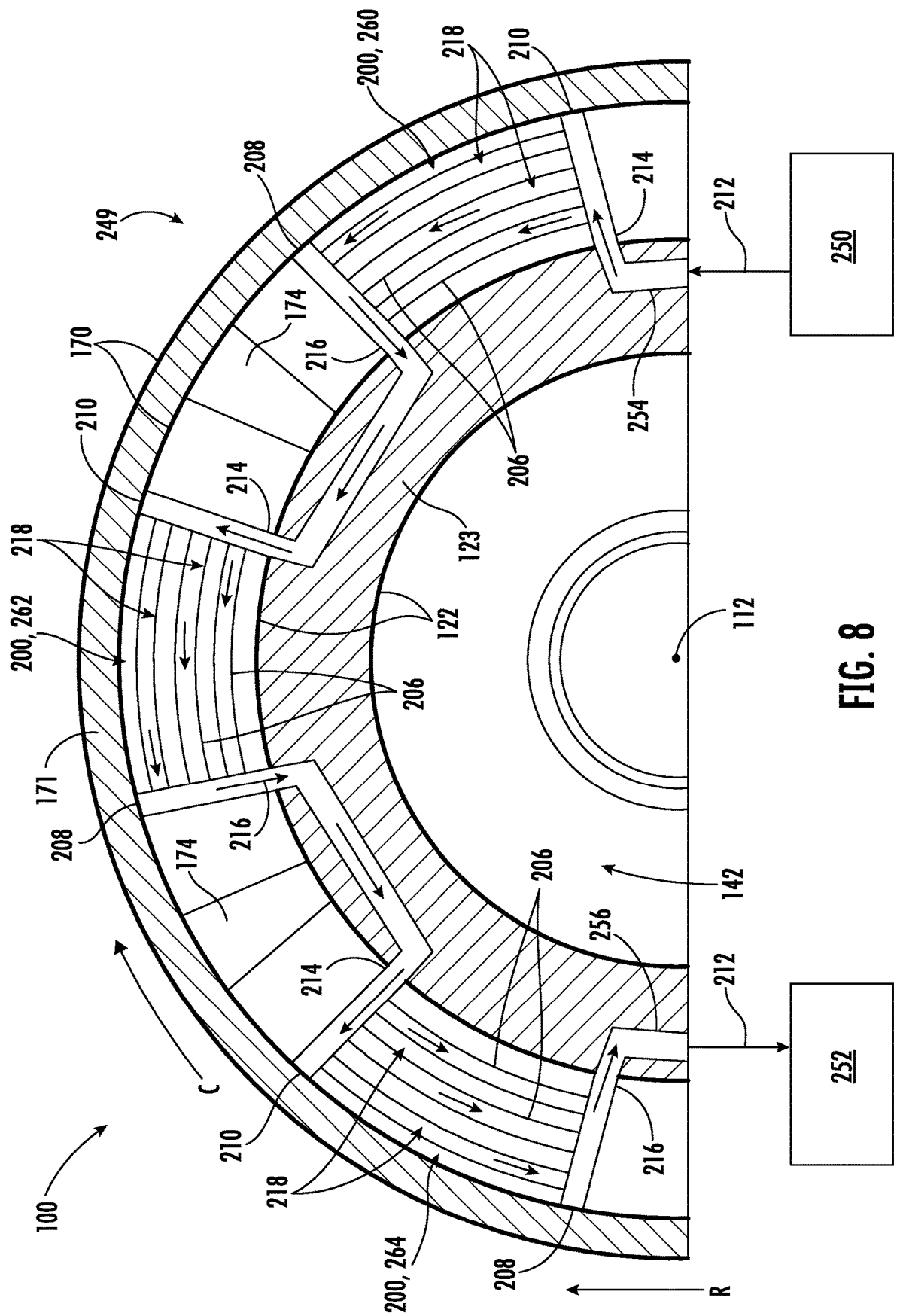
FIG. 8 a schematic cross-sectional view of a three-stream engine in accordance with an exemplary embodiment of the present disclosure.

FIGS. 6-8 illustrate a schematic cross-sectional view of a three-stream engine 100, in which one or more heat exchangers 200 may be circumferentially arranged within the fan duct 172, in accordance with embodiments of the present disclosure. Although FIGS. 6-8 illustrate half of the three-stream engine 100, it should be understood that the features referenced in FIGS. 6-8 may be employed around the entire engine. As discussed above, the air flowing through the fan duct 172 may be traveling generally axially (i.e. into and out of the page with respect to FIGS. 6-8). A portion of the air traveling through the fan duct 172 may pass between the heat exchangers 200, and a portion of the air may pass through the heat exchangers 200 (e.g. between the vanes 206 of the heat exchanger 200).

In the embodiments shown in FIGS. 6-8, the heat exchangers 200 may be disposed within the fan duct 172 and circumferentially spaced apart from one another. For example, the heat exchangers 200 may be positioned equidistant (or non-equidistant in some embodiments) from one another in the circumferential direction C within the fan duct 174. In other embodiments (not shown), the heat exchanger (s) 200 may be continuous in the circumferential direction C (e.g. 360° around the longitudinal axis 112), such that all of the air passing through the fan duct 172 flows through the heat exchanger(s) 200. As depicted in FIGS. 6-8, the core cowl 122 may generally surround and house the supporting frame 123 (shown with cross hatching). Similarly, the fan cowl 170 may generally surround and house the supporting frame 171 (shown with cross hatching). As discussed above, the supporting frames 123, 171 may each provide structural support for the respective cowls 122, 170, as well as various other components of the three stream engine 100. For example, the stationary struts 174 may each extend radially between, and couple to, the supporting frames 123 and 171. Additionally, the one or more heat exchangers 200 may couple (either permanently via a weld or impermanently via a bolt and fastener) to either or both of the supporting frames 123 and 171.

The number, and size, of the heat exchanger(s) 200 may be dependent on how much cooling (or heating) is needed or required for a specific system. In other words, if a large amount of cooling/heating is needed, then the three-stream engine 100 may employ a heat exchanger(s) 200 that occupies a large portion of the fan duct 172. In such embodiments, where the system requires a large amount of cooling (or heating), the circumferential spacing between heat exchangers 200 may be small to none. For example, in some implementations, 100% of the air flowing through the fan duct 172 may pass through the heat exchanger(s) 200. In such implementations, a heat exchanger 200 may extend continuously around the longitudinal centerline 112 (or multiple heat exchangers 200 may abut one another within the fan duct 172 such that no circumferential spacing is provided between heat exchangers 200).

In many implementations, between about 10% and about 100% of the air flowing through the fan duct 172 passes through the heat exchanger(s) 200. In other embodiments, between about 20% and about 100% of the air flowing through the fan duct 172 passes through the heat exchanger (s) 200. In various embodiments, between about 30% and about 100% of the air flowing through the fan duct 172 passes through the heat exchanger(s) 200. In further embodiments, between about 50% and about 100% of the air flowing through the fan duct 172 passes through the heat exchanger(s) 200. In particular embodiments, between about 30% and about 70% of the air flowing through the fan duct 172 passes through the heat exchanger(s) 200.

In various implementations, the heat exchangers 200 may be coupled to the three-stream engine 100 in a variety of ways. For example, as shown, in some embodiments, the heat exchanger 200 may be coupled to the fan cowl 170 (e.g. coupled only to the fan cowl 170 in some embodiments), such that the heat exchanger 200 is secured within the fan duct 172 by the fan cowl 170. In many embodiments, the heat exchanger 200 may extend at least partially through the fan cowl 170 and couple directly to the supporting structure 171 (e.g. only to the supporting structure 171 in some embodiments), which is housed within the fan cowl 170, such that the heat exchanger 200 is secured within the fan duct 172 by the supporting structure 171.

In other embodiments, the heat exchanger 200 may be coupled to the core cowl 122 (e.g. coupled only to the core cowl 122 in some embodiments), such that the heat exchanger 200 is secured to within the fan duct 172 by the core cowl 122. In many embodiments, the heat exchanger 200 may extend at least partially through the core cowl 122 and couple directly to the supporting structure 123 (e.g. only to the supporting structure 123 in some embodiments), which is housed within the core cowl 122, such that the heat exchanger 200 is secured within the fan duct 172 by the supporting structure 123.

In yet still further embodiments, the heart exchanger 200 may be coupled to one or more of the stationary struts 174 (e.g. only to the stationary strut(s) 174 in some embodiments), such that the heat exchanger 200 may be secured within the fan duct by the stationary strut(s) 174. In yet still further embodiments, one or more of heat exchangers may be coupled to any combination of the fan duct 172, the supporting structure 171, the core duct 122, the supporting structure 123, and the one or more stationary struts 174.

In particular embodiments, as described above, each of the heat exchangers 200 may be coupled to a different structure within the fan duct 172 of the three-stream engine 100. For example, as shown, a first heat exchanger 200 may be coupled to the fan cowl 170 (and/or to the supporting structure 171), a second heat exchanger 200 may be coupled to the core cowl 122 (and/or to the supporting structure 123), and a third heat exchanger 200 may be coupled to the stationary strut 174.

Between varying embodiments, the heat exchanger(s) 200 may extend within the fan duct 172 in a variety of ways. For example, in some embodiments, as shown in FIG. 3, one or more heat exchangers 200 may extend radially inward from the fan cowl 170 into the fan duct 172. In such embodiments, the heat exchanger 200 may be radially spaced apart from the core cowl 122, such that the heat exchanger 200 does not contact the core cowl whatsoever in some embodiments. In other embodiments, the heat exchanger 200 may extend radially outward from the core cowl 120 into the fan duct 172. In such embodiments, the heat exchanger 200 may be radially spaced apart from the fan cowl 170, such that the heat exchanger does not contact the fan cowl 170 in some embodiments. In exemplary embodiments, the heat exchanger 200 may extend entirely radially across the fan duct 172 (e.g. between the core cowl 122 and the fan cowl 170).

In exemplary embodiments, the heat exchanger 200 may be mounted within the fan duct 172 only on one end, such that the opposing end of the heat exchanger 200 is free to thermally expand and contract within the fan duct 172, thereby increasing the operational flexibility and life of the heat exchanger 200. For example, as shown, each heat exchanger 200 may extend between a fixed end 208 and a free end 210 within the fan duct 172 to allow for thermal expansion of the heat exchanger 200 within the fan duct 172. In embodiments in which the "onion" style heat exchanger is utilized, the fixed end 208 may be one of the walls 202, 204, and the free end may be the other of the walls 202, 204. The fixed end 208 of the heat exchanger may be welded, brazed, or otherwise permanently coupled to one or more of the fan cowl 170, the supporting structure 171, the core cowl 122, the supporting structure 123, and/or the stationary strut 174. Additionally or alternatively, the fixed end 208 of the heat exchanger 200 may be impermanently coupled to one of the fan cowl 170, the supporting structure 171, the core cowl 122, the supporting structure 123, and/or the stationary strut 174 (e.g. via one or more threaded fasteners, bolts, or any other impermanent coupling, which advantageously allows the heat exchanger 200 to be easily removed). In embodiments where the fixed end 210 is coupled to one of the supporting structures 123 or 171, the fixed end 210 of the heat exchanger 200 may extend through the respective cowl 122 or 170 to couple to the supporting structure 123 or 171. The free end 210 of each heat exchanger 200 may not be coupled to the three-stream engine 100, thereby allowing for unrestricted thermal growth of the heat exchanger 200 within the fan duct 172. In some embodiments, the free end 210 may still contact one or more of the fan cowl 170, the core cowl 122, and/or the stationary strut 174, but be entirely decoupled therefrom, such that the free end 210 may be in sliding contact with one or more surfaces defining the fan duct 172 when the heat exchanger 200 is thermally expanding/contracting.

FIGS. 6 and 7 illustrate cross-sectional schematic views of a three-stream engine 100, which includes a motive fluid supply system 249 that provides the means for the supply and return of a motive fluid 212 to the heat exchangers 200. The motive fluid 212, which is illustrated by the various arrows in FIGS. 6 and 7, may be routed through one or more heat exchangers 200 positioned with the fan duct 172, in accordance with embodiments of the present disclosure.

As shown, each of the heat exchangers 200 includes a motive fluid inlet 214, a motive fluid outlet 216, and a motive fluid circuit 218 defined between the motive fluid inlet 214 and the motive fluid outlet 216 and within the heat exchanger 200. The motive fluid inlet 214 may be defined within the first wall 202, the motive fluid outlet may be defined within the second wall 204, and the motive fluid circuit 218 may be defined within the vanes 206. For example, each heat exchanger 200 may receive motive fluid 212 from a motive fluid supply 250. The motive fluid 212 may then be routed through the motive fluid circuit 218 (i.e. through each of the vanes 206), where the majority of the heat from the motive fluid 212 is transferred to the air traveling through the fan duct 172. Once the motive fluid 212 has passed through the motive fluid circuit 218, it may be expelled from each of the heat exchangers 200, via the motive fluid outlet 218, to a motive fluid return circuit 252. The motive fluid supply 250 may supply one or more hot fluids from various hot systems of the three-stream engine (e.g. one or more lubricants from a lubrication system, one or more fuels from a fueling system, supercritical C02 from a C02 system, or other fluids from other fluid systems in need of cooling/heating). Similarly, the fluid return circuit 252 may return the motive fluid 212 to the system from which it was supplied (and at a lower temperature than when it was supplied).

In the embodiment shown in FIG. 7, each of the heat exchangers 200 may be independently fluidly coupled to the motive fluid supply system 249 (which may be referred to herein as a "parallel configuration"). For example, each of the heat exchangers 200 may be independently fluidly coupled to the fluid supply 250 via the respective motive fluid inlet 214. Similarly, each of the heat exchangers 200 may be independently fluidly coupled to the motive fluid return 252 via the respective motive fluid outlet 216. In such embodiments, each heat exchanger may be fluidly isolated from one another with respect to the motive fluid 212 traveling therethrough.

FIG. 8 illustrates another embodiment of the three-stream engine 100, in which the heat exchangers 200 are fluidly coupled to one another with respect to the motive fluid 212 (which may be referred to herein as a "series configuration" of heat exchangers 200). For example, in the embodiment shown in FIG. 8, the motive fluid 212 may enter a first heat exchanger 260, via the motive fluid inlet 214, and travel through one or more intermediate heat exchangers 262 and the final heat exchanger 264 before being returned via the motive fluid outlet 216 of the final heat exchanger 264. In such embodiments, the motive fluid 212 may travel through each of the heat exchangers 200 within the fan duct 172 before being returned, which may advantageously provide for additional heat transfer between the motive fluid 212 and the air flowing through the fan duct 172.

In the embodiment shown in FIG. 8, a first heat exchanger 262 may receive motive fluid 212 from a motive fluid supply 250. The motive fluid outlet 216 of the first heat exchanger 260 in the plurality of heat exchangers 200 may be fluidly coupled to the motive fluid inlet 216 of a second heat exchanger (e.g. the intermediate heat exchanger 262 in the plurality of heat exchangers 200. Although only one intermediate heat exchanger 262 is shown in FIG. 8, multiple intermediate heat exchangers may be fluidly coupled to one another in the manner described above before the last heat exchanger 264, where the motive fluid is expelled via the motive fluid outlet 216 of the last heat exchanger 264 to the motive fluid return 252. As shown in FIG. 8, each of the heat exchangers 200 may be fluidly coupled to one another via one or more connecting conduits 258, which extend between the outlet 216 of a heat exchanger 200 and the inlet 214 of a neighboring heat exchanger 200.

As shown in FIGS. 7 and 8, the plurality of heat exchangers 200 may be disposed circumferentially between the stationary struts 174. For example, the plurality of heat exchangers 200 may be arranged such that a strut is circumferentially between each heat exchanger 200 of the plurality of heat exchangers 200.

Figure 9:
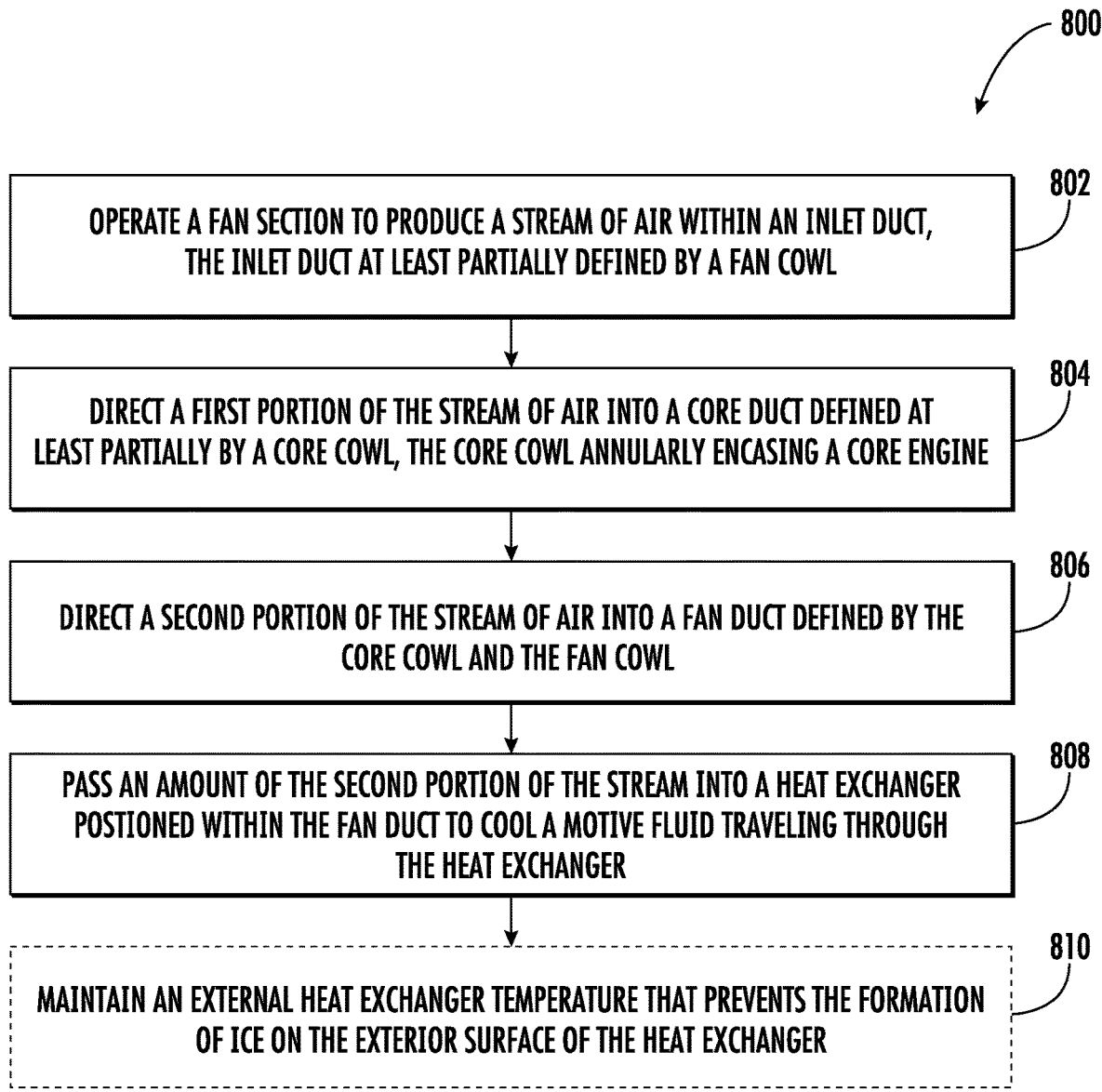
FIG. 9 is a flow diagram of a method for operating a three-stream engine in accordance with an exemplary embodiment of the present disclosure.

Referring now to FIG. 9, a flow diagram of a method 800 for operating a of operating a three-stream engine, in which the dashed boxes indicate optional steps of the method 800. The three-stream engine may be configured in a similar manner as one or more of the exemplary three-stream engines described above with reference to FIGS. 1 through 8.

As is depicted, the method 800 generally includes a step 802 of operating a fan section 150 to produce a stream of air within an inlet duct 180. The inlet duct 180 at least partially defined by a fan cowl 170. In many embodiments, the method 800 may further include a step 804 of directing a first portion of the stream of air into a core duct 142 defined at least partially by a core cowl 122. The core cowl 122 annularly encasing a core engine 120. The method 800 may further include a step 806 of directing a second portion of the stream of air into a fan duct 172 defined by the core cowl 122 and the fan cowl 170. For example the core cowl 122 may be disposed radially between the fan cowl 170 and the core engine 120, such that the core cowl 122 divides (not necessarily evenly, but may be evenly in some embodiments or operating modes) the stream of air within the inlet duct 180 into two separate thrust-producing streams. In particular, the stream of air within the inlet duct 180 may be divided into two streams by the leading edge 144 of the core cowl. The two separate streams of air may be provided to the core duct 142 and the fan duct 172 after being divided.

In exemplary embodiments, the method 800 may further include a step 808 of passing an amount of the second portion of the stream into a heat exchanger 200 poisoned within the fan duct 172 to cool a motive fluid 212 traveling through the heat exchanger 200. For example, the heat exchanger 200 may provide for thermal communication between the motive fluid 212 and the second portion of the stream of air traveling through the fan duct 172. For example, the heat exchanger 200 may be composed (at least partially) of a highly thermally conductive material, such as aluminum, copper, bronze, or other suitable thermally conductive metals. In particular, the heat exchanger 200 may provide for thermal communication between the air and the motive fluid, while fluidly isolating the fluids from one another. In this way, the heat exchanger 200 may advantageously provide for heat transfer the relatively cool air within the third stream or fan duct 172 and one or more motive fluids from a hot system of the three-stream engine (such as a lubrication system, fuel system, or other system benefiting from heat reduction).

In some embodiments, the method 800 may further include an optional step 810 of maintaining an external heat exchanger 200 temperature that prevents the formation of ice on the exterior surface of the heat exchanger 200. For example, the heat exchanger may maintain a warm enough exterior surface, via the motive fluid 212 traveling therethrough, to prevent the formation of ice thereon during operation of the three-stream engine. Additionally or alternatively, the exterior surface of the heat exchanger 200 may be coated with an ice-phobic coating or suitable ice preventative coating, which advantageously increases the operational flexibility and overall life of the heat exchanger 200. In other embodiments, the heat exchanger 200 may include one or more mechanical features that prevent the formation of ice thereon, such as an inlet particle separator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A three-stream engine comprising a fan section, a core engine disposed downstream of the fan section; a core cowl annularly encasing the core engine and at least partially defining a core duct; a fan cowl disposed radially outward from the core cowl and annularly encasing at least a portion of the core cowl, the fan cowl at least partially defining an inlet duct and a fan duct, the fan duct and the core duct at least partially co-extending axially on opposite sides of the core cowl; and a heat exchanger disposed within the fan duct, wherein the heat exchanger provides for thermal communication between a fluid flowing through fan duct and a motive fluid flowing through the heat exchanger.

The apparatus of one or more of these clauses, further comprising at least one stationary strut that couples the core cowl to the fan cowl and extends through the fan duct.

The apparatus of one or more of these clauses, wherein the heat exchanger is disposed forward of the at least one stationary strut within the fan duct.

The apparatus of one or more of these clauses, wherein the heat exchanger is disposed aft of the at least one stationary strut within fan duct.

The apparatus of one or more of these clauses, wherein between about 10% and about 100% of the fluid flowing through the fan duct passes through the heat exchanger(s).

The apparatus of one or more of these clauses, wherein the heat exchanger extends between a fixed end and a free end within the fan duct to allow for thermal expansion of the heat exchanger.

The apparatus of one or more of these clauses, wherein the fixed end is coupled to one of the fan cowl, the core cowl, or a stationary strut that extends radially through the fan duct.

The apparatus of one or more of these clauses, wherein the heat exchanger is a plurality of heat exchangers circumferentially arranged within fan duct.

The apparatus of one or more of these clauses, wherein the plurality of heat exchangers are circumferentially spaced apart from one another.

The apparatus of one or more of these clauses, wherein each heat exchanger in the plurality of heat exchangers includes a motive fluid inlet, a motive fluid circuit, and a motive fluid outlet.

The apparatus of one or more of these clauses, wherein the motive fluid inlet of each heat exchanger of the plurality of heat exchangers is independently fluidly coupled to a motive fluid supply, and wherein the motive fluid outlet of each heat exchanger is independently fluidly coupled to a motive fluid return.

The apparatus of one or more of these clauses, wherein the motive fluid outlet of a first heat exchanger in the plurality of heat exchangers is fluidly coupled to the motive fluid inlet of a second heat exchanger in the plurality of heat exchangers.

The apparatus of one or more of these clauses, wherein the inlet duct extends from an inlet downstream from the fan section to a leading edge of the core cowl.

The apparatus of one or more of these clauses, wherein the fan duct and the core duct each extend from a respective inlet defined partially by the leading edge of the core cowl to a respective outlet.

The apparatus of one or more of these clauses, wherein the turbomachine further comprises a low pressure compressor, a high pressure compressor, a combustion chamber, a high pressure turbine, and a low pressure turbine arranged in a serial flow order within the core duct.

The apparatus of one or more of these clauses, wherein the heat exchanger is configured to prevent the formation of ice thereon during operation of the three-stream engine.

A method of operating a three-stream engine, the method comprising operating a fan section to produce a stream of air within an inlet duct, the inlet duct at least partially defined by a fan cowl; directing a first portion of the stream of air into a core duct defined at least partially by a core cowl, the core cowl annularly encasing a core engine; directing a second portion of the stream of air into a fan duct defined by the core cowl and the fan cowl; and passing an amount of the second portion of the stream into a heat exchanger poisoned within the fan duct to cool a motive fluid traveling through the heat exchanger.

The method of one or more of these clauses, further comprising maintaining an external heat exchanger temperature that prevents the formation of ice on the exterior surface of the heat exchanger.

The method of one or more of these clauses, wherein the heat exchanger extends between a fixed end and a free end within the fan duct to allow for thermal expansion of the heat exchanger.

The method of one or more of these clauses, wherein the inlet duct extends from an inlet downstream from the fan section to a leading edge of the core cowl.

What is claimed is:

1. A three-stream engine comprising:
   a fan section;
   a core engine disposed downstream of the fan section, the core engine comprising a booster compressor disposed upstream from a high pressure compressor;
   a core cowl annularly encasing the core engine and at least partially defining a core duct, wherein the booster compressor and the high pressure compressor are encased within the core cowl;
   a fan cowl disposed radially outward from the core cowl and annularly encasing at least a portion of the core cowl, the fan cowl at least partially defining an inlet duct, and the fan cowl and the core cowl at least partially defining a fan duct, the fan duct and the core duct at least partially co-extending axially on opposite sides of the core cowl;
   at least one stationary strut that couples the core cowl to the fan cowl and extends radially through the fan duct, wherein the at least one stationary strut is disposed axially between the booster compressor and the high pressure compressor;
   a heat exchanger disposed within the fan duct, the heat exchanger comprising a first wall and a second wall, the first wall in contact with and coupled to the at least one stationary strut, the second wall positioned on an interior surface of the fan cowl and on an exterior surface or of the core cowl, the first wall and the second wall each extending radially from the core cowl to the fan cowl into the fan duct, and the at least one stationary strut and the first wall circumferentially spaced apart from the second wall, wherein the first wall is fixed relative to the at least one stationary strut and the second wall is moveable relative to the interior surface and the exterior surface to allow for thermal expansion of the heat exchanger, and wherein the heat exchanger provides for thermal communication between a fluid flowing through the fan duct and a motive fluid flowing through the heat exchanger.

2. The three-stream engine of claim 1, wherein between 10% and 100% of the fluid flowing through the fan duct passes through the heat exchanger.

3. The three-stream engine of claim 1, wherein the heat exchanger is a plurality of heat exchangers circumferentially arranged within the fan duct.

4. The three-stream engine of claim 3, wherein the plurality of heat exchangers are circumferentially spaced apart from one another.

5. The three-stream engine of claim 3, wherein each heat exchanger in the plurality of heat exchangers includes a motive fluid inlet, a motive fluid circuit, and a motive fluid outlet.

6. The three-stream engine of claim 5, wherein the motive fluid inlet of each heat exchanger of the plurality of heat exchangers is independently fluidly coupled to a motive fluid supply, and wherein the motive fluid outlet of each heat exchanger is independently fluidly coupled to a motive fluid return.

7. The three-stream engine of claim 5, wherein the motive fluid outlet of a first heat exchanger in the plurality of heat exchangers is fluidly coupled to the motive fluid inlet of a second heat exchanger in the plurality of heat exchangers.

8. The three-stream engine of claim 1, wherein the inlet duct extends from an inlet downstream from the fan section to a leading edge of the core cowl.

9. The three-stream engine of claim 8, wherein the fan duct and the core duct each extend from a respective inlet defined partially by the leading edge of the core cowl to a respective outlet.

10. The three-stream engine of claim 9, wherein the core engine further comprises a combustion chamber, a high pressure turbine, and a low pressure turbine arranged in a serial flow order within the core duct.

11. The three-stream engine of claim 1, wherein the heat exchanger is coated with an ice-phobic coating.

12. A method of operating a three-stream engine,
the three-stream engine comprising:
a fan section;
a core engine disposed downstream of the fan section, the core engine comprising a booster compressor disposed upstream from a high pressure compressor;
a core cowl annularly encasing the core engine and at least partially defining a core duct, wherein the booster compressor and the high pressure compressor are encased within the core cowl;
a fan cowl disposed radially outward from the core cowl and annularly encasing at least a portion of the core cowl, the fan cowl at least partially defining an inlet duct, and the fan cowl and the core cowl at least partially defining a fan duct, the fan duct and the core duct at least partially co-extending axially on opposite sides of the core cowl;
at least one stationary strut that couples the core cowl to the fan cowl and extends radially through the fan duct, wherein the at least one stationary strut is disposed axially between the booster compressor and the high pressure compressor;
a heat exchanger disposed within the fan duct, the heat exchanger comprising a first wall and a second wall, the first wall in contact with and coupled to the at least one stationary strut, the second wall positioned on an interior surface of the fan cowl and on an exterior surface of the core cowl, the first wall and the second wall each extending radially from the core cowl to the fan cowl into the fan duct, and the at least one stationary strut and the first wall circumferentially spaced apart from the second wall, wherein the first wall is fixed relative to the at least one stationary strut and the second wall is moveable relative to the interior surface and the exterior surface to allow for thermal expansion of the heat exchanger, and wherein the heat exchanger provides for thermal communication between a fluid flowing through the fan duct and a motive fluid flowing through the heat exchanger;
the method comprising:
operating the fan section to produce a stream of air within the inlet duct, the inlet duct at least partially defined by the fan cowl;
directing a first portion of the stream of air into the core duct defined at least partially by the core cowl;
directing a second portion of the stream of air into the fan duct at least partially defined by the core cowl and the fan cowl; and
passing an amount of the second portion of the stream of air into the heat exchanger positioned within the fan duct to cool the motive fluid traveling through the heat exchanger.

13. The method of claim 12, further comprising:
maintaining an external heat exchanger temperature that prevents formation of ice on an exterior surface of the heat exchanger.

14. The method of claim 12, wherein the inlet duct extends from an inlet downstream from the fan section to a leading edge of the core cowl.

15. A gas turbine engine comprising:
a fan section;
a core engine disposed downstream of the fan section; a
a core cowl annularly arranged outward of the core engine and a fan cowl disposed radially outward from the core cowl and annularly encasing at least a portion of the core cowl, and the fan cowl and the core cowl at least partially defining a fan duct, the fan duct and the core duct at least partially co-extending axially on opposite sides of the core cowl;
at least one stationary strut that couples the core cowl to the fan cowl and extends radially through the fan duct, wherein the at least one stationary strut is disposed axially between a booster compressor and a high pressure compressor of the gas turbine engine; and
a heat exchanger disposed within the fan duct, the heat exchanger comprising a first wall and a second wall, the first wall in contact with and coupled to the at least one stationary strut, the second wall positioned on an interior surface of the fan cowl and on an exterior surface of the core cowl, the first wall and the second wall each extending radially from the core cowl to the fan cowl into the fan duct, and the at least one stationary strut and the first wall circumferentially spaced apart from the second wall, wherein the first wall is fixed relative to the at least one stationary strut and the second wall is moveable relative to the interior surface and the exterior surface to allow for thermal expansion of the heat exchanger, and wherein the heat exchanger provides for thermal communication between a fluid flowing through the fan duct and a motive fluid flowing through the heat exchanger.

\* \* \* \* \*